April 1, 1947. K. M. SWEARINGEN 2,418,144
ANTI-HEN SETTING DEVICE
Filed Aug. 28, 1944
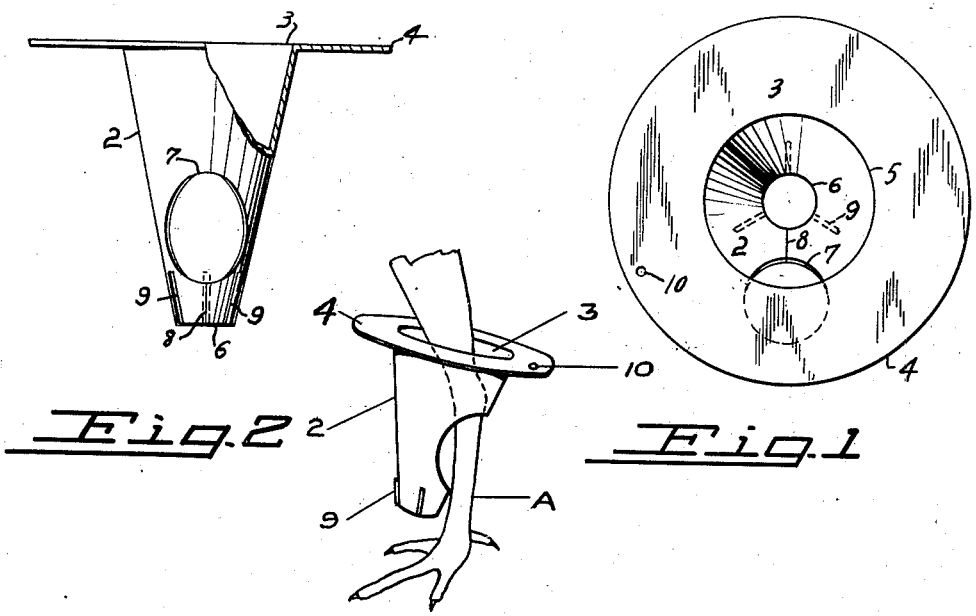
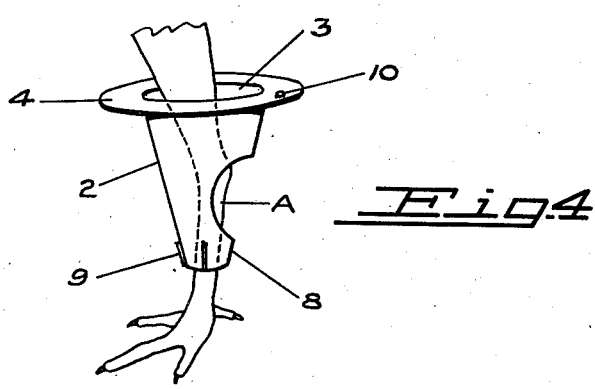
INVENTOR.
Kenneth M. Swearingen
BY Edward C. Healy
ATTORNEY Patented Apr. 1, 1947

2,418,144

UNITED STATES PATENT OFFICE 2,418,144

ANTI-HEN-SETTING DEVICE

Kenneth M. Swearingen, Turlock, Calif.

Application August 28, 1944, Serial No. 551,512

4 Claims. (Cl. 119—97)

This invention relates to improvements in poultry appliances and has particular reference to a device adapted to be detachably secured to the leg of a fowl to prevent, for instance, a hen from setting.

The principal objects of the invention are the provision of a device of the character described that can be quickly and easily applied to the leg of a hen where it is retained thereon against danger of accidental displacement; the provision of an appliance that due to its construction will in no respect interfere with the normal gait of the hen in walking or running, but will be most effective in dislodging the fowl from a nest should she desire to set.

A further object of the invention is the production of an appliance that will consist of varying colors to thus enable the poultryman to determine the length of time the hen has carried a particularly colored device.

An additional object of the invention is the provision of an appliance of the character described that is simple in construction, economical to manufacture, light in weight, and yet strong and durable, and highly efficient in use.

Other objects and advantages will be apparent during the course of the following description.

In the accompanying drawing, wherein for the purpose of illustration, is shown the preferred embodiment of the invention, Fig. 1 is a top plan view of the appliance constructed in accordance with my invention, Fig. 2 is a side elevation of the same, a portion thereof being shown in section, Fig. 3 is a perspective view of the appliance disclosing a leg of a hen as directed through a side hole of the device, and Fig. 4 is a similar view of the appliance disclosing the disposition of the device when the same is in an operative position relative to the leg of a hen.

It is a well known fact that setting hens are a big expense and the source of considerable worry and annoyance to the poultryman. When the poultryman who has a large flock to care for, goes through a chicken house to gather eggs and then comes upon a setting hen, he must drop the egg holding receptacle, take the hen to some other building or pen and hold her until she decides not to set any longer. This operation is expensive for he must feed her in the pen for about ten days. When the said hen is moved out and back again she will not lay for about two weeks. The loss to the poultryman is obvious. The small poultryman with only a few hens seldom has a pen in which he can put the fowl, so following her natural instinct the hen hangs about and tries to set, sometimes for over a month. To therefore produce a device that will overcome the above recited losses and inconveniences, I have produced my unique anti-hen setting appliance.

Referring to the drawing, the numeral 2 designates an inverted cone-shaped plastic member having a top plate 3 equipped with a peripheral flange 4, said plate having an enlarged central opening 5 provided therein. It will be noted that the apex of the cone has been cut away to provide a restricted opening 6 oppositely disposed to the enlarged opening 5 of the top plate 3. An enlarged aperture 7 is provided in the side of the member 2 adjacent the restricted opening 6, while a slit 8 extends from the restricted opening 6 to the enlarged aperture 7. The lower end of the cone-shaped member is strengthened by suitably reinforcing the same as at 9.

I propose to also provide means for hanging or suspending the appliance on a bucket, which means is in the form of a hole 10, formed in the flange 4.

In the operation of the device the appliance is held in the position illustrated in Fig. 2. A leg of the hen indicated by the reference character A is then inserted through the enlarged opening 5 and trained or placed through the side hole 7. Due to the fact that the device is made of pliable material, the slit 8 can be readily sprung open and then closed, the opening of the slit allowing the leg of the hen to pass therethrough. Thus the device will be retained on the leg of a hen against danger of accidental displacement. Since the device is light in weight it will in no respect interfere with the normal gait of the hen either in walking or running, and from experience it has been found that in a few minutes the hen will disregard the appliance altogether, and, in fact, forget that she has the appliance on her leg. Should the hen try to set, the device being beneath her body, will cause the hen to be elevated approximately four inches. Should the hen endeavor to dislodge the device, her elbow comes down over the end with the result that the foot of the fowl will be elevated, which action effects a turning of the hen on her back. After this experience, it is obvious that the hen will readily desist from setting.

I have found it most desirable and advantageous to make the device in five different colors, for example red, white, blue, green and yellow, and in practice the poultryman will have hanging on his bucket or other egg holding receptacle on the first day a red colored appliance or appliances. The first hen he contacts will have applied to her leg this colored appliance. Each day he will take a different color of appliance, until the 6th day, at which time he will take off the first color used and start over again. In approximately five days' time the hen has been broken of the habit of setting or, in fact, will not want to set any more, and will consequently lay in a day or two, because she has not been disturbed by moving.

From the foregoing description considered in connection with the accompanying drawing, it will be obvious that I have produced a most unique appliance that will readily accomplish the objects of the invention.

It is to be understood that the form of my invention herewith shown and described is to be taken as a preferred example of the same and that various changes relative to the shape, size, material, and arrangement of parts, may be readily resorted to without departing from the spirit of the invention or the scope of the subjoined claims.

Having thus described my invention, I claim:

1. A poultry appliance comprising an inverted cone-shaped member and having an enlarged opening at one end and a restricted opening at the opposite end, and means forming a part of said member for detachably securing said appliance to the leg of a hen.

2. A poultry appliance comprising an inverted cone-shaped member and having an enlarged opening at one end and a restricted opening at the opposite end, and means provided in said member for detachably securing said appliance to the leg of a hen, said means comprising a slit formed in said member and connecting the restricted opening with an enlarged side opening provided in said cone-shaped member.

3. A poultry appliance comprising an inverted cone-shaped member, an apertured top plate carried by said member, an opening provided in the base of said member and being of a smaller diameter than the aperture in said top plate, an oval shaped opening provided in the side wall of said member, and a slit extending from the base to the oval shaped opening, whereby the appliance is detachably secured about the leg of a hen.

4. A poultry appliance comprising a member capable of encircling the leg of a hen, said member having a top opening, a bottom opening and a side opening therein, and a slit formed in said member and connecting the bottom and side openings for detachably securing said member to the leg of the hen.

KENNETH M. SWEARINGEN.

REFERENCES CITED

The following references are of record in the file of this patent:

UNITED STATES PATENTS

| Number | Name | Date |
| --- | --- | --- |
| 1,787,531 | Jordan | Jan. 6, 1931 |
| 1,837,038 | Glover | Dec. 15, 1931 |
| 1,346,954 | Griffey | July 20, 1920 |
| 1,272,657 | Greenman | July 16, 1918 |
| 1,321,819 | Gottschalk | Nov. 18, 1919 |